US009933193B2

(12) United States Patent
Yamamoto

(10) Patent No.: US 9,933,193 B2
(45) Date of Patent: Apr. 3, 2018

(54) AIR-CONDITIONING APPARATUS

(71) Applicant: Mitsubishi Electric Corporation, Tokyo (JP)

(72) Inventor: Kazuhide Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 51 days.

(21) Appl. No.: 15/122,252

(22) PCT Filed: Apr. 2, 2015

(86) PCT No.: PCT/JP2015/060452
§ 371 (c)(1),
(2) Date: Aug. 29, 2016

(87) PCT Pub. No.: WO2015/152369
PCT Pub. Date: Oct. 8, 2015

(65) Prior Publication Data
US 2016/0363357 A1 Dec. 15, 2016

(30) Foreign Application Priority Data

Apr. 4, 2014 (JP) .................... 2014-077950

(51) Int. Cl.
*F25B 49/02* (2006.01)
*F25B 13/00* (2006.01)
(Continued)

(52) U.S. Cl.
CPC .............. *F25B 49/02* (2013.01); *C09K 5/045* (2013.01); *F25B 13/00* (2013.01); *F25B 31/004* (2013.01);
(Continued)

(58) Field of Classification Search
CPC .................. F25B 31/004; F25B 43/006; F25B 2313/0314; F25B 2500/28;
(Continued)

(56) References Cited

U.S. PATENT DOCUMENTS 6,247,320 B1 * 6/2001 Sumida .................. C09K 5/045
62/114
2016/0290683 A1 * 10/2016 Mahmoud ............... F25B 13/00

FOREIGN PATENT DOCUMENTS

JP  H05-093558 A   4/1993
JP  H11-248267 A   9/1999
(Continued)

OTHER PUBLICATIONS

Office Action dated Sep. 13, 2016 for the corresponding JP application No. 2014-077950 (and English translation).
(Continued)

*Primary Examiner* — Marc Norman
(74) *Attorney, Agent, or Firm* — Posz Law Group, PLC

(57) ABSTRACT

An air-conditioning apparatus includes a refrigeration cycle charged with non-azeotropic refrigerant mixture and refrigerating machine oil. A suction pipe which is a refrigerant pipe connecting between a suction port of a compressor and an accumulator has an end portion on the side of the accumulator extending into the accumulator. In addition, the suction pipe of the air-conditioning apparatus includes an oil return hole formed in a portion of the suction pipe located inside the accumulator at a position higher than a central portion of the accumulator. A controller of the air-conditioning apparatus controls an opening degree of a pressure reducing device so as to make quality of refrigerant flowing into the accumulator less than 1.

2 Claims, 3 Drawing Sheets

(51) Int. Cl.
   *F25B 43/00*     (2006.01)
   *F25B 31/00*     (2006.01)
   *C09K 5/04*      (2006.01)

(52) U.S. Cl.
   CPC ...... *F25B 43/006* (2013.01); *C09K 2205/122* (2013.01); *C09K 2205/126* (2013.01); *C09K 2205/22* (2013.01); *C09K 2205/34* (2013.01); *F25B 2313/02741* (2013.01); *F25B 2313/0314* (2013.01); *F25B 2313/0315* (2013.01); *F25B 2400/121* (2013.01); *F25B 2500/28* (2013.01); *F25B 2600/21* (2013.01); *F25B 2600/2513* (2013.01); *F25B 2700/2113* (2013.01); *F25B 2700/2117* (2013.01); *F25B 2700/21151* (2013.01); *F25B 2700/21152* (2013.01)

(58) Field of Classification Search
   CPC .... F25B 2600/2513; F25B 2700/21151; F25B 2700/21152; F25B 2700/2117; C09K 5/045; C09K 2205/122; C09K 2205/126; C09K 2205/22; C09K 2205/34
   See application file for complete search history.

(56) References Cited

FOREIGN PATENT DOCUMENTS

| | | |
|---|---|---|
| JP | 2000-249432 A | 9/2000 |
| JP | 2009-257740 A | 11/2009 |
| JP | 2010-197033 A | 9/2010 |
| JP | 2012-145302 A | 8/2012 |

OTHER PUBLICATIONS

International Search Report of the International Searching Authority dated Jun. 30, 2015 for the corresponding international application No. PCT/JP2015/060452 (and English translation).

Extended European Search Report dated Sep. 8, 2017 issued in corresponding EP patent application No. 15772271.1.

Office Action dated Dec. 14, 2017 issued in corresponding RU patent application No. 2016143191/12(069201) (and English translation).

* cited by examiner

AIR-CONDITIONING APPARATUS

CROSS REFERENCE TO RELATED APPLICATIONS

This application is a U.S. national stage application of PCT/JP2015/060452 filed on Apr. 2, 2015, and is based on Japanese Patent Application No. 2014-077950 filed on Apr. 4, 2014, the disclosures of which are incorporated herein by reference.

TECHNICAL FIELD

The present invention relates to an air-conditioning apparatus that employs a non-azeotropic refrigerant mixture.

BACKGROUND ART

Conventionally, HFC refrigerants that have high global warming potential (GWP) have been known as refrigerant applicable to a refrigeration cycle of an air-conditioning apparatus and the like. For example, HFC-R410A which is a near azeotropic refrigerant, and HFC-R32 which is a single refrigerant are mainly employed. In addition, in recent years a refrigeration cycle apparatus has been proposed that employs a non-azeotropic refrigerant mixture containing a HFO refrigerant having low GWP such as HFO-1234yf or HFO-1234ze, and an R32 refrigerant (see, for example, Patent Literature 1).

CITATION LIST

Patent Literature

Patent Literature 1: Japanese Unexamined Patent Application Publication No. 2009-257740

SUMMARY OF INVENTION

Technical Problem

Since HFC-R32 has a characteristic that suppresses pressure loss during passing through a refrigerant pipe in a refrigeration cycle, HFC-R32 has high evaporation capacity. However there is a problem that HFC-R32 has high GWP. In contrast, although HFO-1234yf and HFO-1234ze have low GWP, such refrigerants suffer larger pressure loss during passing through the refrigerant pipe in the refrigeration cycle, and hence there is a problem that the evaporation capacity is degraded. Accordingly, even when the non-azeotropic refrigerant mixture containing HFC-R32 and HFO-1234yf, or HFC-R32 and HFO-1234ze is employed, the performance of the air-conditioning apparatus may be degraded depending on the characteristic of the HFO refrigerant.

Further, in a conventional air-conditioning apparatus that employs the near azeotropic refrigerant such as HFC-R410A or a single refrigerant such as HFC-R32, a pressure reducing device is controlled, in a normal operation, so as to maintain the quality of the refrigerant at 1 or higher at the inlet of an accumulator connected to the suction side of a compressor, to prevent liquid refrigerant from being stored in the accumulator. Accordingly, in the conventional air-conditioning apparatus that employs the near azeotropic refrigerant such as HFC-R410A or a single refrigerant such as HFC-R32, the refrigerant pipe connecting between the accumulator and the suction port of the compressor has an end portion on the side of the accumulator extending into the accumulator, and includes an oil return hole (small hole) that prevents accumulation of refrigerating machine oil in the accumulator, the oil return hole being formed in a portion of the refrigerant pipe extending into the accumulator at a position corresponding to a lower portion of the accumulator. The conventional air-conditioning apparatus configured as above is controlled so as to store the liquid refrigerant in the accumulator, when the refrigerant quality of 1 or higher is unable to be secured transiently. Accordingly, when the refrigerant quality falls below 1 the liquid refrigerant is sucked into the compressor through the oil return hole together with the refrigerating machine oil, and therefore loss of suction pressure of the compressor is increased, resulting in degraded performance of the air-conditioning apparatus.

The present invention has been made in view of the foregoing problem, and provides an air-conditioning apparatus that employs a non-azeotropic refrigerant mixture, and that improves performance despite liquid refrigerant being stored in the accumulator.

Solution to Problem

An aspect of the present invention provides an air-conditioning apparatus including a refrigeration cycle in which a compressor, a condenser, a pressure reducing device, an evaporator and an accumulator are connected via a refrigerant pipe, and a controller that controls an opening degree of the pressure reducing device. A suction pipe, which is the refrigerant pipe connecting between a suction port of the compressor and the accumulator, has an end portion on a side of the accumulator extending into the accumulator, and the refrigeration cycle is charged with a non-azeotropic refrigerant mixture and refrigerating machine oil. The suction pipe includes an oil return hole formed in a portion of the suction pipe inside the accumulator, at a position higher than a central portion of the accumulator, and the controller is configured to control the opening degree of the pressure reducing device so as to make quality of refrigerant flowing into the accumulator less than 1.

Advantageous Effects of Invention

In the air-conditioning apparatus configured as above, the refrigeration cycle is charged with the non-azeotropic refrigerant mixture and the quality of the refrigerant flowing into the accumulator is controlled to be less than 1. Accordingly, in the components of the non-azeotropic refrigerant mixture, the refrigerant having a higher boiling point can be stored in the accumulator with priority. When the non-azeotropic refrigerant mixture containing, for example, HFO-1234yf or HFO-1234ze and an R32 refrigerant is employed, HFO-1234yf or HFO-1234ze which is higher in boiling point can be stored in the accumulator. Thus, the air-conditioning apparatus configured as above can make content of the HFC-R32 in the composition of the circulating refrigerant higher than that in the composition of the charged refrigerant. Therefore, the refrigeration cycle efficiency is improved, degradation in performance of the air-conditioning apparatus that employs the non-azeotropic refrigerant mixture can be prevented.

Further, in the air-conditioning apparatus configured as above, the oil return hole is formed on the suction pipe in a portion of the suction pipe located inside the accumulator, at a position higher than the central portion of the accumulator. Accordingly, the compressor can be prevented from sucking liquid refrigerant despite the refrigerant being stored in the accumulator, and also degradation in performance of the air-conditioning apparatus due to loss of suction pressure of the compressor can be prevented.

Therefore, a high-performance air-conditioning apparatus that employs the non-azeotropic refrigerant mixture can be obtained by the aspect of the present invention.

DESCRIPTION OF EMBODIMENT

Embodiment

Figure 1:
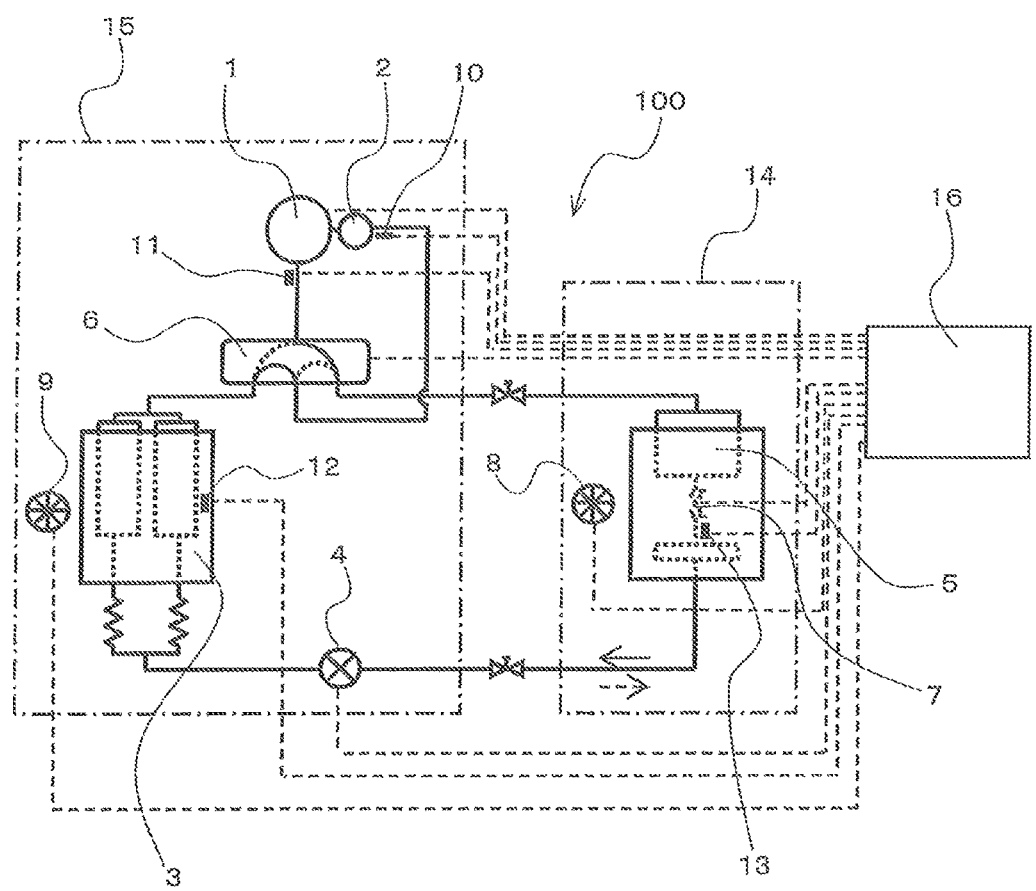
FIG. 1 is a schematic diagram showing a refrigerant circuit of an air-conditioning apparatus according to the Embodiment of the present invention.
Figure 2:
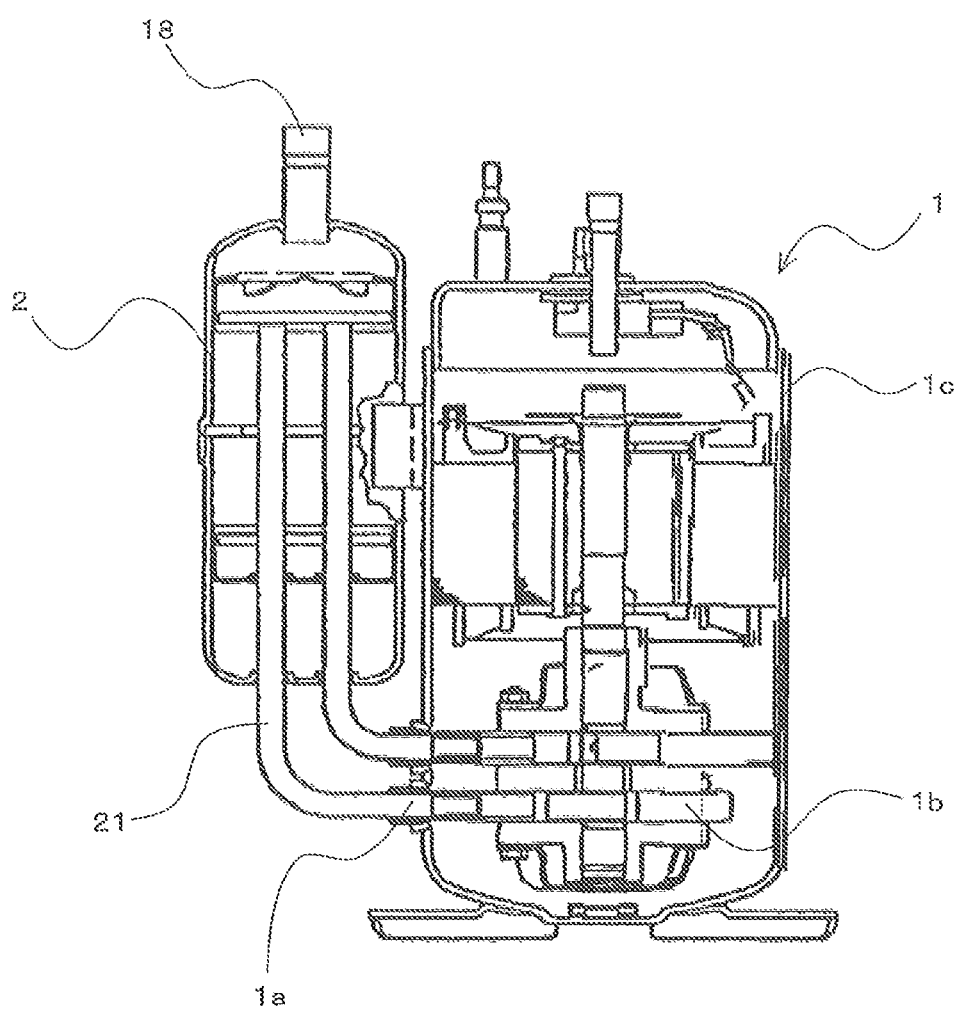
FIG. 2 is a longitudinal section view showing a compressor and an accumulator of the air-conditioning apparatus according to the Embodiment of the present invention.
Figure 3:
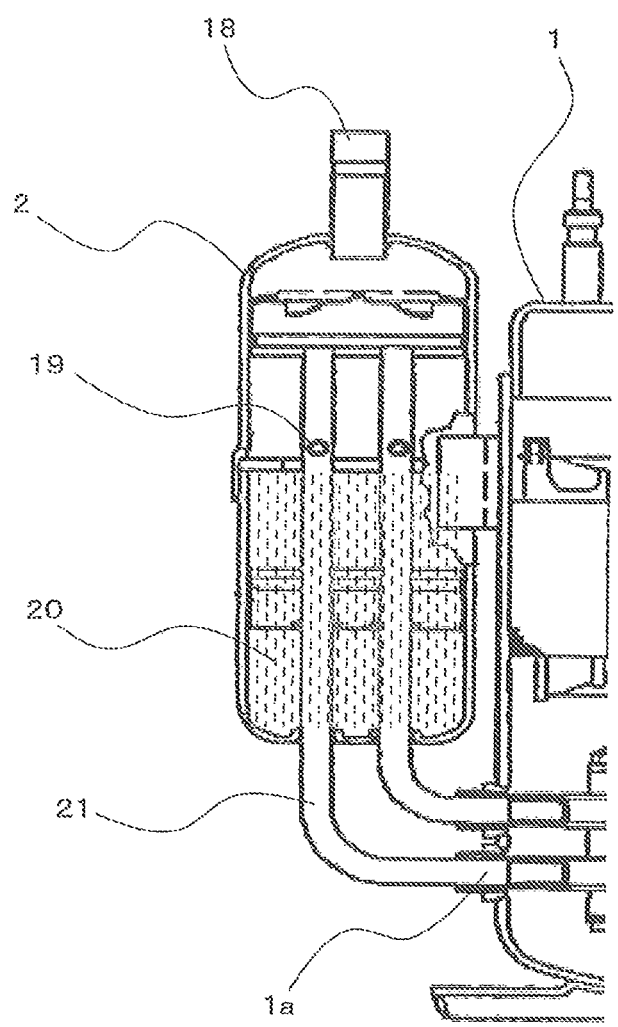
FIG. 3 is an enlarged view of a principal part (longitudinal section view) showing the accumulator and the periphery thereof, of the air-conditioning apparatus according to the Embodiment of the present invention.

FIG. 1 is a schematic diagram showing a refrigerant circuit of an air-conditioning apparatus according to the Embodiment of the present invention. FIG. 2 is a longitudinal section view showing a compressor and an accumulator of the air-conditioning apparatus. FIG. 3 is an enlarged view of a principal part (longitudinal section view) showing the accumulator and the periphery thereof, of the air-conditioning apparatus. In FIG. 1, a solid line arrow indicates a flow direction of refrigerant in a heating operation, and a broken line arrow indicates a flow direction of the refrigerant in a cooling operation.

Referring to FIG. 1, the air-conditioning apparatus 100 according to the Embodiment includes a refrigeration cycle in which a compressor 1 that compresses refrigerant, a four-way valve 6 that switches a circulating direction of the refrigerant depending on whether a cooling operation or a heating operation is performed, an outdoor side heat exchanger 3 that acts as a condenser in the cooling operation and acts as an evaporator in the heating operation, a pressure reducing device 4 (for example, an electronic expansion valve) that depressurizes high-pressure liquid refrigerant into low-pressure two-phase gas-liquid refrigerant, an indoor side heat exchanger 5 that acts as an evaporator in the cooling operation and acts as a condenser in the heating operation, and an accumulator 2 that separates the liquid refrigerant from gas refrigerant and supplies the gas refrigerant to the compressor 1, are connected via a refrigerant pipe. In other words, the refrigeration cycle of the air-conditioning apparatus 100 in the cooling operation includes the compressor 1, the outdoor side heat exchanger 3 acting as the condenser, the pressure reducing device 4, the indoor side heat exchanger 5 acting as the evaporator, and the accumulator 2, which are connected in a loop via the refrigerant pipe. In the heating operation, the refrigeration cycle of the air-conditioning apparatus 100 includes the compressor 1, the indoor side heat exchanger 5 acting as the condenser, the pressure reducing device 4, the outdoor side heat exchanger 3 acting as the evaporator, and the accumulator 2, which are connected in a loop via the refrigerant pipe.

The refrigeration cycle configured as above is charged with a non-azeotropic refrigerant mixture containing a refrigerant having a low boiling point and a refrigerant having a high boiling point. In the Embodiment, HFC-R32 is used as the low-boiling point refrigerant, and HFO-1234yf or HFO-1234ze is used as the high-boiling point refrigerant.

In the air-conditioning apparatus 100, in addition, the outdoor side heat exchanger 3 includes an outdoor side fan 9, and the indoor side heat exchanger 5 includes an indoor side fan 8 (for example, cross flow fan). The air-conditioning apparatus 100 according to the Embodiment also includes a solenoid valve for dehumidification and reheat 7, to be used in a dehumidifying operation for causing a part of the indoor side heat exchanger 5 to act as the evaporator to thereby dehumidify room air, and causing another part of the indoor side heat exchanger 5 to act as the condenser to thereby heat the dehumidified air and return the heated air to the room space.

Further, the air-conditioning apparatus 100 according to the Embodiment includes a compressor suction refrigerant temperature sensor 10 provided in the refrigerant pipe located on the inlet side of the accumulator 2 to detect the temperature of the refrigerant flowing through this point, a compressor discharge refrigerant temperature sensor 11 provided in the pipe located on the discharge side of the compressor 1 to detect the temperature of the refrigerant flowing through this point, an outdoor side heat exchanger refrigerant temperature sensor 12 provided, for example, in an intermediate portion of the outdoor side heat exchanger 3 to detect the temperature of the refrigerant flowing through the outdoor side heat exchanger 3, and an indoor side heat exchanger refrigerant temperature sensor 13 provided, for example, in an intermediate portion of the indoor side heat exchanger 5 to detect the temperature of the refrigerant flowing through the indoor side heat exchanger 5. The mentioned sensors, the four-way valve 6, the pressure reducing device 4, the solenoid valve for dehumidification and reheat 7, the indoor side fan 8 and the outdoor side fan 9 are electrically connected to the controller 16. Thus, the controller 16 is configured so as to receive the values detected by the sensors and to independently control each of the four-way valve 6, the pressure reducing device 4, the solenoid valve for dehumidification and reheat 7, the indoor side fan 8, and the outdoor side fan 9.

In the Embodiment, the compressor suction refrigerant temperature sensor 10, the compressor discharge refrigerant temperature sensor 11, the outdoor side heat exchanger refrigerant temperature sensor 12, and the indoor side heat exchanger refrigerant temperature sensor 13 are configured to detect the temperature of the refrigerant pipe, to thereby indirectly detect the temperature of the refrigerant.

Here, the indoor side heat exchanger refrigerant temperature sensor 13 (sensor that detects the temperature of the refrigerant flowing through the evaporator) operating in the cooling operation, and the outdoor side heat exchanger refrigerant temperature sensor 12 (sensor that detects the temperature of the refrigerant flowing through the evaporator) operating in the heating operation correspond to the first refrigerant temperature sensor in the present invention. In addition, the compressor suction refrigerant temperature sensor 10 corresponds to the second refrigerant temperature sensor in the present invention.

Among the components of the air-conditioning apparatus 100 configured as above, the compressor 1, the accumulator 2, the outdoor side heat exchanger 3, the pressure reducing device 4, the four-way valve 6, the outdoor side fan 9, the compressor suction refrigerant temperature sensor 10, the compressor discharge refrigerant temperature sensor 11, and the outdoor side heat exchanger refrigerant temperature sensor 12 are located inside an outdoor unit 15. The indoor side heat exchanger 5, the solenoid valve for dehumidification and reheat 7, the indoor side fan 8, and the indoor side heat exchanger refrigerant temperature sensor 13 are located inside an indoor unit 14. The controller 16 may be provided either in the outdoor unit 15 or in the indoor unit 14, or may be divided into parts to be respectively located in the outdoor unit 15 and the indoor unit 14.

Hereunder, the connection configuration between the compressor 1 and the accumulator 2 in the air-conditioning apparatus 100 according to the Embodiment will be described in detail.

As shown in FIG. 2 and FIG. 3, a suction port 1a of the compressor 1 and the accumulator 2 are connected to each other via a suction pipe 21. The compressor 1 according to the Embodiment is a high-pressure type compressor that discharges the refrigerant compressed by a compression mechanism unit 1b into a sealed container 1c. The compressor 1 includes two rotary compression mechanism units 1b. Accordingly, in the Embodiment the suction ports of the respective compression mechanism units 1b are each connected to the accumulator 2 via the suction pipes 21, in other words two suction pipes 21 are provided.

The configuration of the compression mechanism unit 1b of the compressor 1 is not limited to the rotary type, and also the number of compression mechanism units 1b is not limited to two.

An end portion of the suction pipe 21 connected to the accumulator 2 is formed so as to extend into the accumulator 2. To be more detailed, an L-shaped pipe is employed as the suction pipe 21 in the Embodiment, and the end portion of the suction pipe 21 on the side of the accumulator 2 extends upwardly into the accumulator 2 through the bottom portion thereof. In addition, as shown in FIG. 3, an oil return hole 19, for example formed as a small hole, is provided in a portion of the suction pipe 21 located inside the accumulator 2, at a position higher than a central portion of the accumulator 2. As will be subsequently described, the air-conditioning apparatus 100 according to the Embodiment is configured to cause the refrigerant of which the quality is less than 1 to flow into the accumulator 2 through an accumulator suction pipe 18, to thereby store the liquid refrigerant in the accumulator 2. Accordingly, it is preferable that the oil return hole 19 is formed at the position higher than the central portion of the accumulator 2.

The air-conditioning apparatus 100 configured as above works as described hereunder.

In the cooling operation, high-temperature and high-pressure gas refrigerant compressed by the compressor 1 and discharged therefrom flows into the outdoor side heat exchanger 3 through the four-way valve 6. In the outdoor side heat exchanger 3, air outside the room, blown by the outdoor side fan 9 provided in the air path of the outside air, exchanges heat with the refrigerant during passing through between fins and tubes (heat transfer pipe) of the outdoor side heat exchanger 3, and the refrigerant is cooled by emitting condensation latent heat to the outdoor side air thereby turning into high-pressure liquid refrigerant. Thus, the outdoor side heat exchanger 3 acts as condenser. The liquid refrigerant which has flowed out of the outdoor side heat exchanger 3 is depressurized upon passing through the pressure reducing device 4 thereby turning into low-pressure two-phase gas-liquid refrigerant, and flows into the indoor side heat exchanger 5. In the indoor side heat exchanger 5, by driving the indoor side fan 8 provided in the air path of the room air, the room air exchanges heat with the refrigerant during passing through between fins and tubes (heat transfer pipe) of the indoor side heat exchanger 5, so that the air blown into the room is cooled. The two-phase gas-liquid refrigerant is evaporated by removing heat from the room air in the form of evaporation latent heat.

Here, the controller 16 controls the opening degree of the pressure reducing device 4 so as to make the quality of the refrigerant flowing into the accumulator 2 less than 1, in other words so as to allow the two-phase gas-liquid refrigerant to flow into the accumulator 2. Specifically, in the Embodiment, the controller 16 subtracts the value (B degrees Celsius) detected by the indoor side heat exchanger refrigerant temperature sensor 13 attached to the indoor side heat exchanger 5 acting as the evaporator, from the value (A degrees Celsius) detected by the compressor suction refrigerant temperature sensor 10 provided on the suction side of the accumulator 2, thereby obtaining a degree of superheat (A-B). Then the controller 16 controls the opening degree of the pressure reducing device 4 so as to make the degree of superheat (A-B) less than 0 degrees Celsius. The temperature of the non-azeotropic refrigerant mixture of a wet state (two-phase gas-liquid) gradually decreases during the evaporation. Therefore, making the degree of superheat (A-B) less than 0 degrees Celsius allows the quality of the refrigerant flowing into the accumulator 2 to be less than 1.

The refrigerant of which the quality is less than 1, or the two-phase gas-liquid refrigerant, is separated into liquid refrigerant and gas refrigerant, in the accumulator 2. When the non-azeotropic refrigerant mixture is employed, more specifically when a refrigerant mixture containing HFC-R32 (boiling point: −58.3 degrees Celsius) and HFO-1234yf (boiling point: −29 degrees Celsius), or a refrigerant mixture containing HFC-R32 and HFO-1234ze (boiling point: −19 degrees Celsius) is employed, the refrigerant of the higher boiling point can be stored in the accumulator 2 as liquid refrigerant 20 owing to the physical property of the refrigerant, and therefore the content of HFC-R32 in the composition of the circulating refrigerant can be made higher than that in the composition of the charged refrigerant.

In the case in which an excessive amount of liquid refrigerant 20 is introduced in the mentioned process, the liquid refrigerant 20 is accumulated irrespective of the difference in boiling point. Therefore, it is preferable that the opening degree of the pressure reducing device 4 is controlled so as to make the degree of superheat (A-B) less than, but close to, 0 degrees Celsius. This can increase the content of HFC-R32 in the composition of the circulating refrigerant to a maximal level.

Here, conventionally the oil return hole is formed at a position corresponding to a lower portion of the accumulator. Accordingly, when the conventional air-conditioning apparatus is operated so as to store the liquid refrigerant in the accumulator, as with the air-conditioning apparatus 100 according to the Embodiment, the liquid refrigerant is sucked into the compressor through the oil return hole together with refrigerating machine oil, and therefore loss of suction pressure of the compressor increases and hence the performance of the air-conditioning apparatus is degraded. In the air-conditioning apparatus 100 according to the Embodiment, in contrast, the oil return hole 19 is formed at the position higher than the central portion of the accumulator 2, as stated above. Accordingly, even when the liquid refrigerant is stored in the accumulator 2, the oil return hole 19 may be located above the liquid refrigerant as shown in FIG. 3. Therefore, in the air-conditioning apparatus 100 according to the Embodiment, only the refrigerating machine oil deposited over the liquid refrigerant is sucked through the oil return hole 19, and hence the liquid refrigerant can be prevented from being sucked through the oil return hole 19. Consequently, degradation in performance of the air-conditioning apparatus 100 can be prevented.

After the two-phase gas-liquid refrigerant is separated into the liquid refrigerant and the gas refrigerant in the accumulator 2, the gas refrigerant (more strictly, gas refrigerant in which the ratio of HFC-R32 has been increased) is sucked into the compressor 1 through the end portion of the suction pipe 21 on the side of the accumulator 2, thus to be again compressed. Thereafter, through repetition of the phase transition of the refrigerant performed by repeating the similar process, the room space is air-conditioned (cooled) with the air cooled in the indoor side heat exchanger 5.

In the heating operation, the four-way valve 6 is inverted so as to cause the refrigerant to flow in the opposite direction in the refrigeration cycle, with respect to the flow direction in the cooling operation, and the indoor side heat exchanger 5 acts as the condenser and the outdoor side heat exchanger 3 acts as the evaporator, and the room space is air-conditioned (heat) with the air heated in the indoor side heat exchanger 5.

In the mentioned operation, the controller 16 controls the opening degree of the pressure reducing device 4 so as to make the quality of the refrigerant flowing into the accumulator 2 less than 1, in other words so as to allow the two-phase gas-liquid refrigerant to flow into the accumulator 2. More specifically, the controller 16 subtracts the value (B degrees Celsius) detected by the outdoor side heat exchanger refrigerant temperature sensor 12 attached to the outdoor side heat exchanger 3 acting as the evaporator, from the value (A degrees Celsius) detected by the compressor suction refrigerant temperature sensor 10 provided on the suction side of the accumulator 2, thereby obtaining a degree of superheat (A-B). Then the controller 16 controls the opening degree of the pressure reducing device 4 so as to make the degree of superheat (A-B) less than 0 degrees Celsius. Such a controlling operation allows the quality of the refrigerant flowing into the accumulator 2 to be less than 1.

As described thus far, the configuration of the air-conditioning apparatus 100 according to the Embodiment allows the refrigerant having the higher boiling point among the refrigerants composing the non-azeotropic refrigerant mixture to be stored in the accumulator with priority. For example, when the non-azeotropic refrigerant mixture containing HFO-1234yf or HFO-1234ze and the R32 refrigerant is employed, HFO-1234yf or HFO-1234ze, which has higher boiling point, can be stored in the accumulator. Thus, the air-conditioning apparatus 100 according to the Embodiment can make the content of HFC-R32 in the composition of the circulating refrigerant higher than that in the composition of the charged refrigerant. Therefore, refrigeration cycle efficiency in the air-conditioning apparatus 100 according to the Embodiment can be improved, and degradation in performance of the air-conditioning apparatus 100 employing the non-azeotropic refrigerant mixture can be prevented. In addition, the air-conditioning apparatus 100 according to the Embodiment includes the oil return hole 19 at the position higher than the central portion of the accumulator 2. Accordingly, in the air-conditioning apparatus 100 according to the Embodiment the compressor 1 can be prevented from sucking the liquid refrigerant despite the refrigerant being stored in the accumulator 2, and therefore degradation in performance of the air-conditioning apparatus 100 due to loss of suction pressure of the compressor 1 can be prevented.

Consequently, the configuration of the air-conditioning apparatus 100 according to the Embodiment provides the air-conditioning apparatus 100, which employs the non-azeotropic refrigerant mixture, with high-level performance.

REFERENCE SIGNS LIST 1 compressor, 1a: suction port, 1b compression mechanism unit, 1c sealed container, 2 accumulator, 3 outdoor side heat exchanger, 4 pressure reducing device, 5 indoor side heat exchanger, 6 four-way valve, 7 solenoid valve for dehumidification and reheat, 8 indoor side fan, 9 outdoor side fan, 10 compressor suction refrigerant temperature sensor, 11 compressor discharge refrigerant temperature sensor, 12 outdoor side heat exchanger refrigerant temperature sensor, 13 indoor side heat exchanger refrigerant temperature sensor, 14 indoor unit, 15 outdoor unit, 16 controller, 18 accumulator suction pipe, 19 oil return hole, 20 liquid refrigerant, 21 suction pipe, 100 air-conditioning apparatus.

The invention claimed is:
1. An air-conditioning apparatus comprising:
a refrigeration cycle in which a compressor, a condenser, a pressure reducing device, an evaporator and an accumulator are connected via a refrigerant pipe, the refrigeration cycle being charged with a non-azeotropic refrigerant mixture and refrigerating machine oil;
a controller that controls an opening degree of the pressure reducing device;
a suction pipe, which is the refrigerant pipe connecting between a suction port of the compressor and the accumulator, having an end portion on a side of the accumulator extending into the accumulator;
a first refrigerant temperature sensor that detects a temperature of refrigerant flowing through the evaporator; and
a second refrigerant temperature sensor that detects a temperature of refrigerant flowing into the accumulator,
wherein the suction pipe includes an oil return hole formed in a portion of the suction pipe located inside the accumulator, at a position higher than a central portion of the accumulator, and
wherein the controller is configured to control the opening degree of the pressure reducing device so as to make a value obtained by subtracting a value detected by the first refrigerant temperature sensor from a value detected by the second refrigerant temperature sensor less than 0 degrees Celsius and to make quality of refrigerant flowing into the accumulator less than 1.
2. The air-conditioning apparatus of claim 1,
wherein the non-azeotropic refrigerant mixture is a mixture of HFO-1234yf or HFO-1234ze and HFC-R32.

* * * * *